United States Patent [19]

Rizk et al.

[11] Patent Number: 4,567,107
[45] Date of Patent: Jan. 28, 1986

[54] ACRYLIC RESIN HAVING PENDANT SILANE GROUPS THEREON, AND METHODS OF MAKING AND USING THE SAME

[75] Inventors: Sidky D. Rizk, Westfield; Harry W. S. Hsieh, Rahway; Michael P. Mazzeo, Hightstown, all of N.J.

[73] Assignee: Essex Specialty Products, Inc., Clifton, N.J.

[21] Appl. No.: 641,051

[22] Filed: Aug. 15, 1984

Related U.S. Application Data

[62] Division of Ser. No. 374,989, May 5, 1982, Pat. No. 4,491,650.

[51] Int. Cl.$^4$ .................. B32B 27/40; B05D 3/02; D05D 1/36
[52] U.S. Cl. ................ 428/425.5; 156/307.5; 156/329; 427/163; 427/207.1; 427/208.2; 427/208.4; 427/387; 427/389.7; 427/388.2; 427/407.1; 427/407.2; 428/425.6; 428/429; 428/447; 428/448
[58] Field of Search .............. 427/163, 207.1, 208.2, 427/208.4, 208.8, 387, 389.7, 388.2, 407.1, 407.2; 428/447, 429, 448, 425.5, 425.6; 156/329, 307.5

[56] References Cited

U.S. PATENT DOCUMENTS

| | | | |
|---|---|---|---|
| 3,779,794 | 12/1973 | De Santis | 156/329 X |
| 4,146,585 | 3/1979 | Ward et al. | 156/329 X |
| 4,188,451 | 2/1980 | Humphrey, Jr. | 427/163 X |
| 4,268,554 | 5/1981 | Gras | 427/389.7 X |
| 4,352,839 | 10/1982 | Olson et al. | 427/240 |
| 4,396,681 | 8/1983 | Rizk et al. | 428/423.1 |

OTHER PUBLICATIONS

Elements of Polymer Degradation, Reich et al., McGraw-Hill, New York, pp. 303, 304, 316, 341.

*Primary Examiner*—Thurman K. Page
*Attorney, Agent, or Firm*—Curtis, Morris & Safford

[57] ABSTRACT

What are disclosed are a poly(meth)acrylate polymer having pendant hydrolyzable alkoxysilane groups thereon prepared by reacting a poly(meth)acrylate polymer having pendant hydroxy groups thereon with an isocyanato functional alkoxysilane having 1 to 3 hydrolyzable lower alkoxy groups present on the silicon atom thereof; a substrate such as glass or aluminum having a tenacious coating thereon of such a polymer alone or in admixture with another, different, resinous binder component; such a substrate further having a resinous sealant composition applied over said tenacious coating as a primer; and methods for making such a polymer and such coated substrates.

18 Claims, No Drawings

ACRYLIC RESIN HAVING PENDANT SILANE GROUPS THEREON, AND METHODS OF MAKING AND USING THE SAME

This is a divisional of application Ser. No. 374,989, filed May 5, 1982, now U.S. Pat. No. 4,491,650 granted Jan. 1, 1985.

The present invention relates to certain poly(meth)acrylate polymers having pendant alkoxysilane groups thereon and to methods for making the same, to methods of making tenacious coatings on a substrate with a composition comprising such a poly(meth)acrylate polymer, to the compositions employed in making such tenacious coatings on a substrate, to methods of further bonding a resinous sealant composition to such a tenacious coating, which serves as a primer for said sealant composition, and to substrates having such a tenacious polymer coating thereon and a resinous sealant composition bonded to said primer coating.

The term "poly(meth)acrylate polymer" as used herein refers to homopolymers of esters of acrylic acid and of esters of methacrylic acid, as well as to copolymers formed between such acrylic acid esters and/or methacrylic acid esters.

U.S. Pat. No. 4,146,585 to Ward et al. granted Mar. 27, 1979 discloses in detail certain moisture-curable compositions, characterized as "polymeric adhesion promoters", which compositions comprise a silane grafted binary copolymer or terpolymer prepared by reacting an isocyanato functional organosilane containing from 1 to 3 silicon-bonded hydrolyzable groups with a hydroxy-functional copolymer or terpolymer. The copolymer or terpolymer starting material critically contains from 25 to 60 percent by weight of vinyl chloride units polymerized therein, from 10 to 75 weight percent of hydroxyalkyl acrylate units copolymerized therewith, and may optionally further contain from 0 to 30 percent by weight of a further comonomer selected from the group consisting of alkyl esters of alpha, beta-ethylenically unsaturated carboxylic acids and vinyl esters of saturated fatty acids. Such a copolymer or terpolymer, which contains pendant hydroxy groups contributed by the content therein of hydroxyalkyl acrylate, is reacted with an isocyanato functional organosilane of the formula

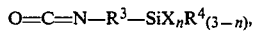

$$O{=}C{=}N{-}R^3{-}SiX_nR^4_{(3-n)},$$

wherein X is a hydrolyzable group, typically a lower alkoxy group, $R^4$ is hydrogen or lower alkyl having up to 4 carbon atoms, n is an integer having a value from 1 to 3 and is preferably 3, and $R^3$ is a divalent organic radical bonded to silicon by either oxygen or carbon and which may be aliphatic, aromatic, or aralipathic in nature. On reaction of such an isocyanato functional organosilane with some or all of the pendant hydroxy groups of the backbone copolymer or terpolymer, the hydroxy group and isocyanate group react to form a urethane linkage, resulting in modification of the backbone polymer to have a plurality of pendant organosilane groups along its length, each group being connected to the backbone polymer by way of the aforementioned urethane linkage. The Ward et al. patent mentioned earlier, which is incorporated herein by reference, shows a variety of such urethane-bonded $R^3$ groups in column 4 thereof, for instance. Among the isocyanato functional organosilanes taught by Ward et al., those preferred for use according to the present invention are isocyanatoalkylalkoxy silanes, preferably isocyanatoalkyltri(lower alkoxy) silanes such as gamma-isocyanatopropyltriethoxy silane.

As disclosed in the Ward et al. patent, the "polymeric adhesion promoters" of the prior art are known to bond tenaciously to non-porous substrates, particularly to inorganic substrates having an oxidic surface such as, particularly, glass and aluminum. In the presence of moisture, the hydrolyzable groups X present in the pendant groups on the backbone polymer hydrolyze and, on the one hand, react with hydroxy or other oxygen-containing groups present on the substrate and, on the other hand, react with each other (perhaps by way of an intermediate silanol), to form polymers which are crosslinked by the presence of siloxane (—Si—O—Si—) linkages. The Ward et al. patent further teaches that such coatings, applied to a non-porous substrate, can be used as primer coatings to facilitate the further adhesion to the substrate of a further, different, resinous material.

Although the coating compositions made according to the Ward et al. patent are urged in that patent to have good weathering properties, the weathering characteristics of the prior art polymers and compositions containing the same fall far short of the demands placed on such compositions by modern technology, particularly by the automotive industry. These compositions, if used as adhesives in automotive construction, or if employed as sealants for the mounting of windshields and automobile windows, simply cannot meet the standards imposed by the automotive industry on such adhesives and sealants, particularly with respect to resistance to heat, moisture, and ultraviolet light.

Accordingly, it is an object of the present invention to provide polymers, useful as adhesives and coating agents, and methods for making and using the same, which will meet rigorous current weathering standards, particularly those imposed by the automotive industry.

This object is achieved according to the present invention by the development of a poly(meth)acrylate polymer having pendant hydrolyzable alkoxysilane groups thereon, which poly(meth)acrylate polymer is prepared by reacting a poly(meth)acrylate polymer having pendant hydroxy groups thereon with an isocyanato functional alkoxysilane having from 1 to 3 hydrolyzable lower alkoxy groups present on the silicon atom thereof. Such a poly(meth)acrylate polymer can be employed alone, or in combination with a film-forming resinous binder of some other material, as a composition for forming a tenacious coating on a substrate, suitably a non-porous surface such as glass. Further, such a tenacious coating can be used as a primer coating to facilitate the bonding of a further resinous sealant composition, such as a moisture-curable polyurethane sealant, onto the substrate. The sealant can be used as an adhesive to bond the primed substrate to some other material or can function as a finishing coat. The tenacious coatings prepared according to the present invention employing compositions critically containing a poly(meth)acrylate polymer having pendant hydrolyzable alkoxysilane groups thereon, and seals and adhesive bonds made with sealants bonded to such a tenacious coating as a primer, have outstanding weathering characteristics, i.e. long-term resistance to degradation by deleterious influences such as heat, moisture, and ultraviolet radiation.

The poly(meth)acrylate polymers having pendant hydroxy groups thereon are known in the art and are commercially available, for instance under the tradenames "G-cure" acrylic resins, such as "G-cure 867", G-cure 868", and "G-cure 869", as well as under the tradename "Acryloid", for example as "Acryloid AU-608" and "Acryloid OL-42" resins. These hydroxy functional acrylic and methacrylic polymers are supplied in different solvent systems, for example in toluene, xylene, ethylbenzene, aliphatic hydrocarbons, and ethylene glycol monoethyl ether acetate. The polymers are prepared, for example, by heating together, in solution of suitable solvents in the presence of a free-radical initiator, a mixture of one or more hydroxyalkyl acrylates or methacrylates having an alkylene group containing from 2 to 6 carbon atoms and one or more alkyl acrylates or methacrylates having 1 to 8 carbon atoms in the alkyl group. A method for preparing such compounds is disclosed, for example, in U.S. Pat. No. 3,028,367 to O'Brien. However, the process of that patent is particularly directed to the preparation of relatively low molecular weight compounds and is carried out in the presence of a mercaptan which functions as a chain transfer agent and molecular weight regulator. As is known in the art, higher molecular weight products like those employed according to the present invention can be obtained by decreasing the amount of chain transfer agent present, or eliminating it entirely. The poly(meth)acrylate polymers suitable for use according to the present invention have a weight average molecular weight from about 1,000 to about 100,000, and preferably have a weight average molecular weight from 20,000 to 60,000.

The poly(meth)acrylate polymer of the type described immediately above is reacted with an isocyanato functional organosilane compound having hydrolyzable groups thereon by techniques known in the art and described in the aforementioned Ward et al. patent. The two components are suitably reacted under anhydrous conditions to avoid prereaction of the isocyanate groups with moisture and also to avoid premature hydrolysis and subsequent premature condensation of the hydrolyzable silane groups. The materials are reacted at temperatures between 0° C. and 150° C., preferably between 25° C. and 80° C., until no free isocyanate can be detected in the reaction mixture by infra-red spectroscopy. The reaction is suitably carried out in the presence of a catalyst promoting the formation of urethane linkages, such as a stannous salt of a carboxylic acid (e.g. stannous octoate, stannous oleate, stannous acetate, and stannous laurate), a dialkyltin dicarboxylate (e.g. dibutyltin dilaurate, dibutyltin diacetate), a tertiary amine, or a tin mercaptide. The amount of catalyst is generally from 0.005 to 5 percent, by weight of the mixture catalyzed, depending on the nature of the catalyst employed.

By a simple choice of the ratio of equivalents of hydroxy groups to isocyanato groups reacted, all or only some of the pendant hydroxyl groups on the poly(meth)acrylic backbone polymer can be reacted to form urethane linkages and to introduce a pendant hydrolyzable silane group onto the polymer backbone.

The ratio of hydroxyalkyl(meth)acrylate monomers to alkyl(meth)acrylates in the backbone polymer can vary widely, but each polymer chain will contain at least two pendant hydroxy groups and, usually, many more than two such groups positioned randomly along the polymer backbone chain. The commercially-available materials mentioned earlier herein have hydroxy equivalents, for instance, varying between 400 and 1,000. In view of the permissible molecular weight of the materials, the polymers evidently may contain as few as 3 or 4 groups to 100 or more per polymer chain. Some or all of these may be reacted with isocyanato functional organosilane with the formation of urethane bonds coupling the organosilane graft into the polymer.

For the formation of a tenacious coating on a substrate, the polymer whose preparation and properties are described immediately above can be conveniently applied to the substrate in the form of a solution of the polymer in a volatile organic solvent. After application of the solution to the substrate by conventional methods such as coating, spraying, dipping, painting, and the like, the solvent can be removed by evaporation to leave a film residue of the polymer on the substrate. Prior to application, the polymer is maintained under anhydrous conditions to inhibit premature hydrolysis of the hydrolyzable groups thereon and, of course, the solutions from which the polymer is applied are also anhydrous. Once on the substrate, exposure of the material to ambient atmospheric conditions will result in moisture-curing of the polymer in the presence of atmospheric moisture. As mentioned earlier, the curing reactions involve both the formation of siloxane groups, resulting in a crosslinking of the polymer, as well as reactions of the hydrolyzed silane with reactive groups present in the surface of the substrate, particularly oxidic groups such as are characteristically present on substrates such as glass and aluminum.

The polymers of the invention may also be combined with conventional coating additives, previously carefully dried, including fillers such as carbon black, titanium dioxide, surface-treated silicas, and auxiliary agents such as ultraviolet stabilizers, anti-oxidants, and the like.

In a still further embodiment, the polymers of the invention, with or without conventional fillers and additives of the type described above, can be combined with a different resinous component, suitably a compatible film-forming polymeric binder. The combination of the polymer of the prior art with such a binder can improve the adhesion of the resulting mixture to a substrate and, further, can promote the adhesion of the mixture to still-further resins applied thereover, for example sealant compounds. As exemplary of the film-forming resins with which the polymers of the present invention can be combined in forming tenacious coatings are the poly(meth)acrylate starting materials mentioned earlier herein having pendant hydroxy groups thereon, which groups, however, are unreacted with any further material. In the alternative, the resins of the present invention can be blended with a wide variety of poly(meth)acrylate homopolymers and copolymers. Further, the novel polymers of the invention can be combined with thermoplastic polyurethanes and employed to form tenacious coatings on substrates.

As mentioned earlier, the coatings formed by the use of the novel polymers of the present invention on a substrate can serve as a primer coating for the further application of different resinous materials thereover, in which case the bonding of the different resinous material to the substrate, by way of the primer, is much improved. Such different resinous compositions can be, for example, resinous sealant compositions. Thus, the coating compositions of the present invention find use in the automotive industry as primers used on windshields and other automotive glass prior to bonding of the glass into an automotive structure with a polymeric sealant composition, for example one comprising a polyurethane polymer as a principal ingredient. Suitable polyurethane sealant compositions of this type are taught in De Santis U.S. Pat. No. 3,779,794, for instance, the contents of which are incorporated herein by reference. Improved adhesion of the sealant to the substrate by way of the primer is believed attributable to the bonding of the primer to the substrate by way of the reactions mentioned earlier, as well as the good compatibility of the poly(meth)acrylate backbone of the primer composition with the organic resin components of sealant compositions applied thereover.

In a like fashion, blends of the novel polymer of the invention with some other resin, of the type discussed earlier herein, can form a tenacious coating on a substrate, in which case the novel polymer of the present invention serves as an adhesion promoter for said other resin. Further, such coatings containing combinations of the polymer of the present invention with some other resinous binder material can also be used as primer coatings for the application of some still further resinous material thereover.

In all the aforementioned cases, conventional fillers and additives of the type described earlier herein can be incorporated, care being taken that the materials are carefully dried before admixture with the resins to inhibit premature curing by the introduction of moisture into the compositions.

A better understanding of the present invention and of its many advantages will be had by referring to the following specific Examples, given by way of illustration.

EXAMPLE 1

210 grams of a polyacrylate copolymer having pendant hydroxyl groups, 332 grams of tetrahydrofuran as a solvent, 52 grams of gamma-isocyanatopropyltriethoxy silane, and 0.1 g of dialkyltin dicarboxylate catalyst commercially available under the trade name "Formrez UL-28", were added to a 3-necked glass reaction vessel equipped with a mechanical stirrer, a thermometer, a heating mantle, and a condenser connected to a drying tube. The mixture was then refluxed for 15 hours, i.e. until no isocyanate absorption peak at 4.4 microns could be detected in the infrared spectrum of the reaction mixture. The contents of the vessel contained 30 percent of solids.

The polyacrylate polymer employed is commercially available under the tradename "Acryloid AU-608" and is a copolymer of butyl acrylate and hydroxyethyl acrylate in a mol ratio of approximately 4:1. The material, which has an hydroxy equivalent weight of 600, was introduced into the reaction mixture in solution in a mixture of cellosolve acetate and toluene. The weight average molecular weight of the resin is approximately 19,300 and the equivalent ratio between OH and NCO groups is 1:1.

EXAMPLE 2

Using the procedure of Example 1, 1703 g of the polyacrylate polymer of Example 1 were reacted with 422 grams of gamma-isocyanatopropyltriethoxy silane in 1485 grams of methylethyl ketone as a solvent in the presence of 0.5 g of "UL-28" catalyst as in Example 1. In this mixture, the ratio of equivalents OH:NCO is 1.0:1.0. That is, all of the pendant hydroxy groups present in the polyacrylate starting polymer are converted by reaction with isocyanate into urethane linkages.

The materials were reacted for 6 hours at 80° C. until isocyanate could no longer be detected by infrared spectroscopy. After reaction, the solution was diluted to contain 30 percent of solids by the addition of 1203 g of methylethyl ketone.

EXAMPLE 3

Again proceeding as in Examples 1 and 2, 1391 g of "Acryloid AU-608" polyacrylate polymer and 258 g of gamma-isocyanato propyltriethoxy silane were reacted in 1082 g of methylethyl ketone in the presence of 0.4 g of "UL-28" catalyst as in Examples 1 and 2. In this mixture, the OH:NCO equivalent ratio is 1.0:0.75. That is, not all of the pendant hydroxyl groups present in the polyacrylate starting polymer are converted by reaction with isocyanate into urethane linkages. The final total solids content of the solution is 40 percent.

EXAMPLE 4

137 grams (0.137 hydroxyl equivalent) of "Acryloid AU-608" (a polyacrylate polymer), 202.5 grams of tetrahydrofuran used as a solvent, 28.1 grams (0.137 NCO equivalent) of gamma-isocyanatopropyltrimethoxy silane, and 0.1 gram of "Formrez UL-28" catalyst were added to a 3-necked glass reaction vessel equipped with a mechanical stirrer, a thermometer, a heating mantle, and a condenser connected to a drying tube. The mixture was then refluxed for 13 hours until no isocyanate absorption peak at 4.4 microns could be detected in the IR spectrum of the reaction mixture. The solids content of the mixture was 30 percent and the OH:NCO equivalent ratio is 1.0:1.0.

EXAMPLE 5

375.0 grams (0.375 eq.) of "G-cure 867" (a polyacrylate having pendant hydroxy groups as a 60% solution in a solvent mixture of 55% cellosolve acetate, 19% ethyl benzene, and 26% aliphatic hydrocarbon by weight; hydroxyl equivalent weight of solid resin=600), 92.6 grams (0.375 eq.) of gamma isocyanatopropyltriethoxy silane, 591.1 grams of ethyl acetate and 0.16 grams of "Formrez UL-28" catalyst were added to a three-necked flask equipped with a thermometer, a condenser, and a mechanical stirrer. The reaction was carried out at 75° C. for 15 hours until no icocyanate absorption at 4.4 microns could be detected by IR analysis. The OH:NCO equivalent ratio is 1.0:1.0 and the total solids content is 30% by weight.

EXAMPLE 6

200.0 grams (0.15 eq.) of "G-cure 868" (a polyacrylate having pendant hydroxyl groups as a 60% solution in solvent mixture of 55% cellosolve acetate, 19% ethyl benzene, and 26% aliphatic hydrocarbon by weight; hydroxyl equivalent weight of solid resin=800), 30.8 grams (0.15 eq.) of gamma isocyanatopropyltrimethoxy silane, 271.9 grams of tetrahydrofuran and 0.06 grams of "Formrez UL-28" catalyst were mixed in a three-necked flask equipped with a thermometer, a·condenser, and a mechanical stirrer. The reaction was run at 65° C. for six hours until no isocyanate absorption at 4.4 microns could be detected by IR analysis. The OH:NCO equivalent ratio is 1.0:1.0 and the total solids content is 30% by weight.

EXAMPLE 7

The silane grafted polyacrylate of Example 1 was compounded for use as a primer, adaptable to use on glass, as follows:

100 grams of the 30% silane grafted polyacrylate solution of Example 1 were combined in a one quart steel ball mill with 27.5 grams of anhydrous carbon black. The materials were ground in the ball mill for 16 hours to a Hegman fineness greater than 7½.

Then, 62.5 grams of the silane grafted polyacrylate solution of Example 1 were added to the black grind followed by 37.5 grams of anhydrous toluene and the mixture was ball milled for an additional two hours under anhydrous conditions.

EXAMPLE 8

The silane grafted polyacrylate of Example 2 was compounded for use as a primer, adaptable to use on glass, as follows:

100 grams of the 30% solution of silane grafted polyacrylate synthesized in methylethyl ketone as in Example 2 were combined in a one quart steel ball mill with 27.5 grams of anhydrous carbon black. The materials were ground in the ball mill for 16 hours to a Hegman fineness greater than 7½.

Then 25 grams of a polymethylmethacrylate copolymer commercially available under the tradename "Acryloid B-48N" dissolved in 75 grams of anhydrous toluene were added to the black grind and the mixture was ball milled for an additional two hours under anhydrous conditions.

EXAMPLE 9

The silane grafted polyacrylate of Example 2 was compounded for use as a primer, adaptable to use on glass, as follows:

50 grams of a commercially available polymethylmethacrylate polymer ("Acryloid A-11") were combined in a one quart steel ball mill with 55 grams of anhydrous carbon black and 150 grams of anhydrous methylethyl ketone. The materials were ground in the ball mill for 16 hours to a Hegman fineness greater than 7½.

Then 200 grams of the 30% silane grafted polyacrylate solution of Example 2 were added to the black grind followed by 30 grams of anhydrous methanol and ball the mixture was milled for an additional two hours under anhydrous conditions.

EXAMPLE 10

The silane grafted polyacrylate of Example 4 was compounded for use as a primer, adaptable to use on glass, as follows:

50 grams of a commercially available polymethylmethacrylate polymer ("Acryloid B-50") were combined in a one quart steel ball mill with 56 grams of anhydrous carbon black and 150 grams of anhydrous toluene. The materials were ground in the ball mill for 16 hours to a Hegman fineness greater than 7½.

Then 200 grams of the 30% silane grafted polyacrylate solution of Example 4 were added to the black grind and the mixture was ball milled for an additional one hour under anhydrous conditions.

EXAMPLE 11

The silane grafted polyacrylate of Example 3 (where the equivalent ratio OH:NCO=1:0.75) was compounded for use as a primer, adaptable to use on glass, as follows:

50 grams of a commercially available polymethyl methacrylate polymer ("Acryloid B-50") were combined in a one quart size steel ball mill with 55 grams of anhydrous carbon black and 150 grams of anhydrous toluene. The materials were ground in the ball mill for 16 hours to a Hegman fineness greater than 7½.

Then 200 grams of the 40% silane grafter polyacrylate solution of Example 3 were added to the black grind followed by 20 grams of anhydrous methanol and the mixture was ball milled for an additional one hour under anhydrous conditions.

EXAMPLE 12

The silane grafted polyacrylate of Example 1 was compounded for use as a primer, adaptable to use on glass, as follows:

397 grams of the "Acryloid AU-608" copolymer of butyl acrylate and hydroxyethyl acrylate used as a starting material in the preparation of the polymer of Example 1 were combined in a one gallon ball mill with 554 g of anhydrous methylethyl ketone and 261 g of anhydrous carbon black. The materials were ground in the ball mill to a Hegman fineness greater than 7½.

Then, 1,951 g of the 30% solution of the silane-grafted polyacrylate of Example 1 were added to the black grind and ball milled for one further hour under anhydrous conditions.

EXAMPLE 13

The silane grafted polyacrylate of Example 5 was compounded for use as a primer, adaptable to use on glass, as follows:

40 grams of the "Acryloid B-50" polymethyl methacrylate used as a binder in Example 10 were combined in a quart ball mill with 120 g of anhydrous toluene and 45 g of anhydrous carbon black. The materials were ground in the ball mill to a Hegman fineness greater than 7½.

Then, 160 g of the 30% solution of silane-grafted polyacrylate of Example 5 were added to the black grind followed by 20 g of anhydrous methanol and ball milled for one further hour under anhydrous conditions.

EXAMPLE 14

The silane grafted polyacrylate of Example 6 was compounded for use as a primer, adaptable to use on glass, by replacing the silane grafted polyacrylate of Example 5 with the silane grafted polyacrylate of Example 6 in the primer composition of Example 13.

EXAMPLE 15

Each of the black compounded compositions of Examples 7 through 14 was applied by brush onto separate clean untreated 1"×4" glass plates, where it dried into a film in from 5 to 10 minutes. The black coating was allowed to age and fully crosslink in the presence of atmospheric moisture by storage for seven days at room temperature under ambient atmospheric conditions. Adhesion was tested by cross-hatching the coating with "Scotch" brand adhesive tape and then removing the tape. Good adhesion is indicated by a failure of the tape to remove the coating from the glass substrate. The aged, coated glass panel was then subjected to a weathering resistance test by storing it in a humidity cabinet for three weeks at 100 percent relative humidity and 100° F.

In each of these eight coatings, the extreme conditions of temperature and humidity had no detectable effect on adhesion. That is, in each case, the coating was resistant to removal from the glass substrate when attempted to be removed therefrom using the adhesive tape test described.

EXAMPLE 16

1"×4" glass panels coated by brushing with the compositions of Examples 7 through 14 and aged at room temperature as in Example 15 were subjected to the effect of ultraviolet light, together with both humidity and heat, by placing the coated panels in an Atlas Twin Enclosed Carbon Arc "Weather-O-Meter" Model CDMC for 1000 hours, during which the temperature was maintained at 190° F. with intermittent water spray.

Subsequent to testing, the coated panels were checked and no change in adhesion characteristics of the coatings were observed using the adhesive tape test described in Example 15. That is, in each case, before and after weathering the adhesive tape failed to remove the coating from the glass substrate.

EXAMPLE 17

The use of the composition of the present invention as a primer, over which an adhesive sealant composition is subsequently applied, is illustrated in this Example.

A clean, untreated glass surface and a painted metal surface were bonded together as follows:

4"×1" glass panels were each separately coated with one of the primer compositions of Examples 7 through 14 using the method of Example 15. Next, a bead, ¼" wide and ⅛" high, of a moisture-curable polyurethane composition, made according to the teachings of U.S. Pat. No. 3,779,794 as the reaction product of diphenylmethane-4,4-diisocyanate and a mixture of polyoxypropylene diol and polyoxypropylene triol further compounded with carbon black and inorganic fillers, was laid down across the 1" edge of each coated glass panel so that the sealant and primer were in contact over an area of 1"×¼".

Next, a painted metal panel, 1"×4", was applied over each sealant bead with compression of the sealant bead to a height of ⅛".

The resulting laminates were then allowed to moisture-cure for one week under ambient temperature and humidity conditions.

The resistance of the bonded composites to humidity was next tested by putting the composites in a humidity box at 100 percent relative humidity at a temperature of 100° F. for seven continuous days. The lap shear strength was then checked with an "Instron" testing machine, in each case giving a shear strength value of 500 psi with cohesive failure of polyurethane sealant.

The weathering properties of the bonded composites were tested by subjecting them to humidity and ultraviolet light for 1000 hours in an Atlas Twin Enclosed Carbon Arc "Weather-O-Meter" Model CDMC with ultraviolet light passing through the glass panel. The temperature was kept at 190° F. with intermittent water spray. When lap shear strength was tested on the "Instron" testing machine, there was in each case cohesive failure of the sealant at a lap shear force of 600 psi.

In both the humidity and weathering tests, the primer according to the present invention remained intact and perfectly adhered to the glass surface to which it had been applied.

What is claimed is:

1. A method for forming a tenacious coating, resistant to weathering, on a substrate, which method comprises applying to said substrate a resinous composition comprising a poly(meth)acrylate polymer having pendant hydrolyzable alkoxysilane groups grafted thereon, said poly(meth)acrylate polymer being a copolymer consisting essentially of one or more hydroxyalkyl acrylates or methacrylates and one or more alkyl acrylates or methacrylates, and then hydrolyzing said pendant hydrolyzable alkoxysilane groups in the presence of moisture.

2. The method as in claim 1 wherein said resinous composition additionally comprises a film-forming resinous binder component different from said poly(meth)acrylate polymer.

3. A method as in claim 1 wherein said substrate is glass.

4. A substrate having thereon a tenacious coating, resistant to weathering, made by the method of claim 1.

5. A substrate having thereon a tenacious coating, resistant to weathering, made by the method of claim 2.

6. A substrate having thereon a tenacious coating, resistant to weathering, made by the method of claim 3.

7. A method as in claim 1 wherein a resinous sealant composition is further applied over said tenacious coating, which latter serves as a primer for said sealant composition.

8. A method as in claim 2 wherein a resinous sealant composition is further applied over said tenacious coating, which latter serves as a primer for said sealant composition.

9. A method as in claim 3 wherein a resinous sealant composition is further applied over said tenacious coating, which latter serves as a primer for said sealant composition.

10. A method as in claim 7 wherein said resinous sealant composition is a moisture-curable polyurethane sealant.

11. A method as in claim 8 wherein said resinous sealant composition is a moisture-curable polyurethane sealant.

12. A method as in claim 9 wherein said resinous sealant composition is a moisture-curable polyurethane sealant.

13. A substrate having a tenacious primer coating thereon and a resinous sealant composition bonded to said primer coating, made by the method of claim 7.

14. A substrate having a tenacious primer coating thereon and a resinous sealant composition bonded to said primer coating, made by the method of claim 8.

15. A glass substrate having a tenacious primer coating thereon and a resinous sealant composition bonded to said primer coating, made by the method of claim 9.

16. A substrate as in claim 13 wherein said resinous sealant composition is a moisture-curable polyurethane sealant.

17. A substrate as in claim 14 wherein said resinous sealant composition is a moisture-curable polyurethane sealant.

18. A glass substrate as in claim 15 wherein said resinous sealant composition is a moisture-curable polyurethane sealant.

* * * * *